Figure 1:
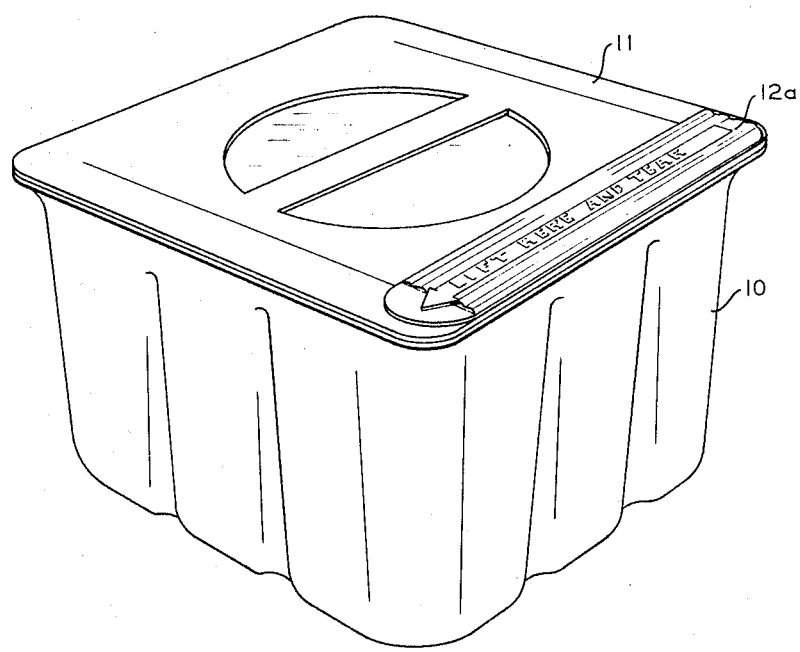

Nov. 29, 1966  A. SCHECHTER  3,288,323
HEAT SEALED CONTAINER COVER WITH TEAR TAPE OPENING
Filed Dec. 21, 1961  2 Sheets-Sheet 1

INVENTOR.
ALFRED SCHECHTER
BY Young and Quigg
ATTORNEYS

Nov. 29, 1966 A. SCHECHTER 3,288,323
HEAT SEALED CONTAINER COVER WITH TEAR TAPE OPENING
Filed Dec. 21, 1961 2 Sheets-Sheet 2
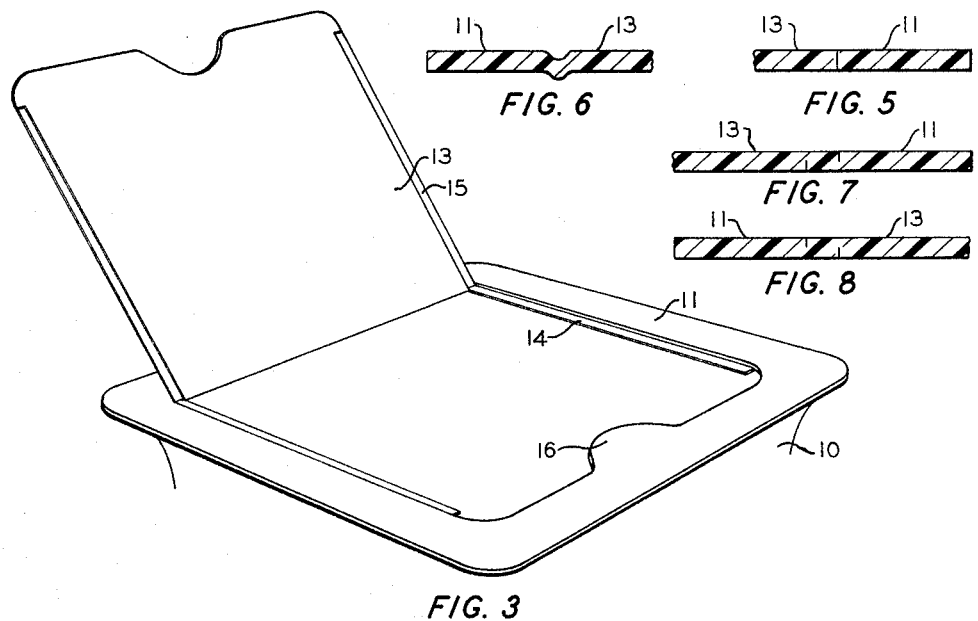
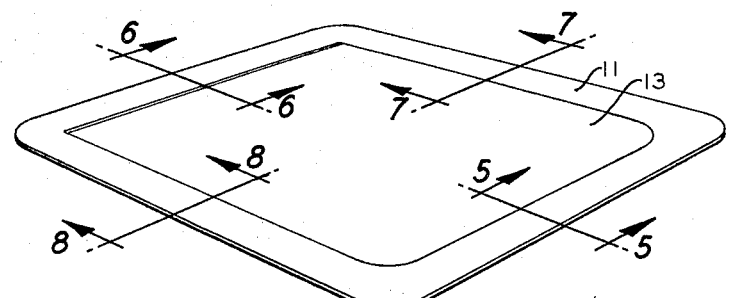
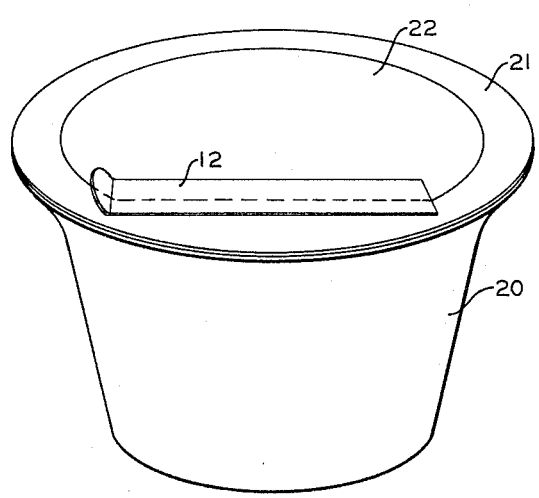
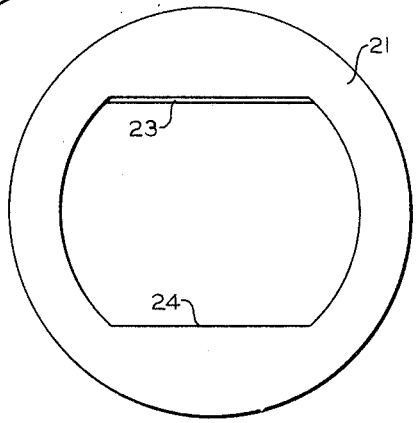
INVENTOR.
ALFRED SCHECHTER
BY Young and Quigg
ATTORNEYS United States Patent Office 3,288,323
Patented Nov. 29, 1966

3,288,323
HEAT SEALED CONTAINER COVER WITH
TEAR TAPE OPENING
Alfred Schechter, New Rochelle, N.Y., assignor, by mesne assignments, to Phillips Petroleum Company, a corporation of Delaware
Filed Dec. 21, 1961, Ser. No. 161,229
12 Claims. (Cl. 220—54)

This invention relates to a formed rigid container having a heat sealed cover. In one aspect this invention relates to a rigid thermoplastic container cover adapted to seal hermetically a rigid thermoplastic container. In another aspect it relates to a container cover having a heat sealed tear strip covering a starting opening in the container cover. In still another aspect it relates to a method for fabricating a hermetically sealed formed container that can be opened easily.

With the advent of thermoplastic resins in plentiful supply, the food packaging industry has turned to these thermoplastic materials for the fabrication of containers for food and similar products which require protection from the atmosphere. The closure or cover members for rigid thermoplastic containers are conveniently secured to the container by heat sealing; however, the removal of such covers presents a problem when it is desired to open the container for consumption of the products. Container closures having a perforated area for ease of opening the container have been proposed; however, the perforations prevent the package from being hermetically sealed. For the packaging of some foods it is essential that the package be hermetically sealed and it is at least desirable, if not essential, that the package be easily opened.

Figure 2:
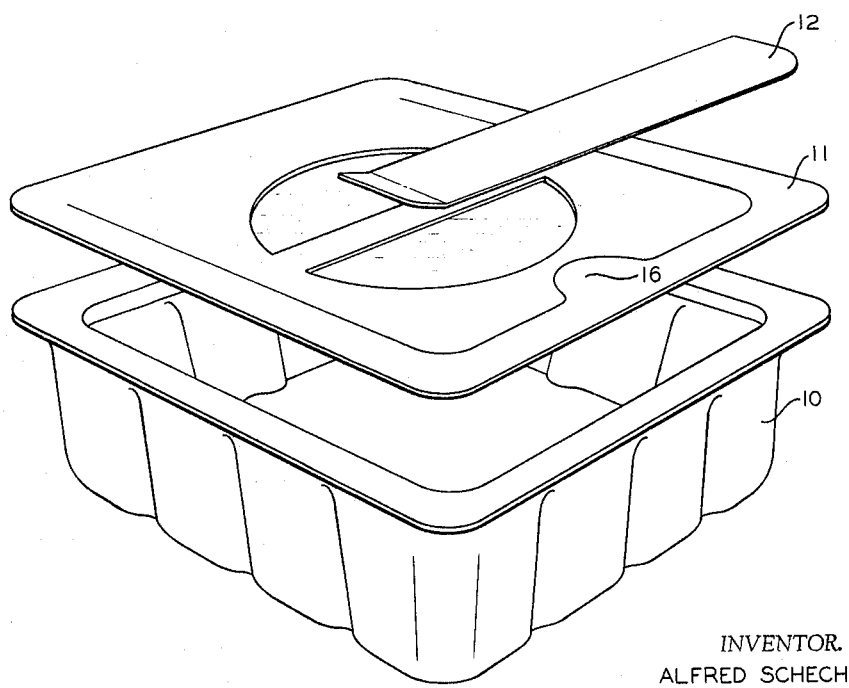

It is an object of this invention to provide a hermetically sealed container having incorporated therein means to facilitate opening the container. It is also an object of this invention to provide a method for fabricating a container which can be hermetically sealed and which can be easily opened without the requirement of auxiliary equipment. It is also an object of this invention to provide a hermetically sealed thermoplastic container having incorporated therein means to facilitate opening the container. Another object is to provide a method for fabricating a rigid thermoplastic container which can be hermetically sealed. Still another object is to provide a cover for a container having a cut-through portion which is sealed by a strip of thermoplastic heat sealed thereto. A further object of this invention is to provide a cover for a thermoplastic container having a cut-through portion which is sealed by a tear strip heat sealed thereto. Other objects and advantages of the invention will be apparent to one skilled in the art upon study of this disclosure including the detailed description and the appended drawing wherein:

FIGURE 1 is a perspective view of a package sealed according to the practice of the invention;
FIGURE 2 is an exploded view of the container of FIGURE 1 separated into its separate components;
FIGURE 3 is an illustration of the package of FIGURE 1 in opened position;
FIGURE 4 is an illustration of a thermoplastic cover suitable for use with the package of FIGURE 1;
FIGURE 5 is a sectional view along line 5—5 of FIGURE 4;
FIGURE 6 is a sectional view along line 6—6 of FIGURE 4;
FIGURE 7 is a sectional view along line 7—7 of FIGURE 4;
FIGURE 8 is a sectional view along line 8—8 of FIGURE 4;
FIGURE 9 is a view of an embodiment of the invention as applied to a differently shaped package; and
FIGURE 10 is a plan view of a cover for use with the container shown in FIGURE 9.

Referring now to the drawing and particularly to FIGURE 2, a container as illustrated in FIGURE 1 is composed of the container 10, the cover 11 which is to be sealed to the container and the tear strip 12. FIGURE 3 illustrates the container with the lid portion 13 of the cover 11 in open position showing the ledge 14 of the cover portion which cooperates with a similar ledge 15 of the lid portion to facilitate reclosing the package and to prevent the lid from passing on into the container.

The details of the fabrication of the container cover or closure are shown more clearly in FIGURES 4 to 8 wherein it can readily be seen that the portion of the periphery of the lid 13, which is designated as 5—5, comprises a line which is cut all the way through the closure 11. FIGURES 7 and 8 show that the cover is scored on the top and bottom sides so that when the cut-through edge of the lid portion is lifted the cover along the lines traversed by 7—7 and 8—8 will be severed so as to form a ledge on the lid portion and a ledge on the cover portion as illustrated in FIGURE 3. The top and bottom scored lines should be substantially parallel and sufficiently close together so that the space between them is less than the unsevered distance of the scored lines so that the tear will occur between the scored lines rather than from a scored line to the opposite surface of the cover. The line traversed by 6—6 can conveniently be a crease in the cover which forms a hinge portion as the lid portion of the cover is lifted. Thus it can be seen that the cover is impermeable along the lines 6—6; 7—7; and 8—8 but is permeable along the line 5—5 because of the cut through the cover element 11. The cover is rendered impermeable over its entire surface by heat sealing tear strip 12 over the cut portion of the lid 11. The lid portion 13 can be fabricated so as to be completely removable by scoring the line traversed by 6—6 the same as that of 7—7 and 8—8. Starting the opening at the cut-through line traversing 5—5 can be facilitated by forming a thumb tab 16 such as shown in FIGURES 2 and 3.

FIGURE 9 illustrates the invention as applied to a cylindrical container 20 having cover 21, tear strip 12 and lid section 22. In this modification the portion of the circle defining the lid section 22 which is covered by the tear strip 12 can be cut through the closure 21 as illustrated in FIGURE 5 with respect to closure 11 and the remaining periphery of the lid section 22 can be scored as illustrated in FIGURE 7 with respect to the closure 11 of FIGURE 4. Alternatively, a portion of the periphery of closure 21 can be creased as indicated at 23 in a manner similar to the illustration in FIGURE 6 as applied to FIGURE 4. The cut-through portion can represent an arc of a circle, as shown in FIGURE 9, or can represent a chord of a circle, as shown at 24 in FIGURE 10.

The cut-through portion of the closure can be in a straight or curved line; can contain a thumb tab as indicated by 16 in FIGURES 2 and 3; or can be scalloped as desired. The tear tape can be a plain strip of thermoplastic material as shown at 12 in FIGURE 2 or can be ribbed and decorated as shown in 12a of FIGURE 1.

The closures can be solid, opaque thermoplastic material or can have window sections incorporated therein of transparent thermoplastic material as indicated in FIGURES 1 and 2.

The containers and the novel covers for the containers can be fabricated from any suitable material having the required characteristics of strength and flexibility.

Strength is necessary for durability and flexibility is required to minimize breakage resulting from handling. Thus, any suitable relatively rigid material possessing a limited flexibility can be employed in fabricating containers and covers according to the invention. The choice of materials will depend in some instances upon the end use intended for the container, the contents being packaged, shipping conditions, storage conditions, etc. The containers and covers can be fabricated by any of the known methods such as injection molding, blow molding and thermo forming for thermoplastic materials and compression molding, rolling, stamping and the like for materials such as paper board.

Examples of thermoplastic materials which can be employed in fabricating the containers and covers of the invention include moldable plastic materials such as normally solid polymers of 1-olefins, e.g., polyethylene, polypropylene, and copolymers of ethylene and propylene; polystyrene; polystyrene mixed with minor amounts of natural or synthetic rubber; condensation products such as phenol-aldehyde resins; vinylchloride acetate; so-called tailored resins, examples of which are mixtures of polyethylene and polyisobutylene and mixtures of copolymers of ethylene and propylene with polyisobutylene, and the like.

In some instances, it is desirable to fabricate the receptacle portion of the container from a material possessing a higher strength or rigidity, e.g., polystyrene mixed with minor amounts of rubber, and fabricate the cover element of a material possessing a greater flexibility, e.g., a polyethylene; or vice versa. In other instances, both the receptacle and the cover can be advantageously fabricated of the same materials. In many instances, all three major elements, i.e., the receptacle, the cover, and the tear strip can all be fabricated from the same material.

Transparent film or sheet material is in many instances desired for the cover so as to exhibit the contents of the receptacle. Said film or sheet material can be polyethylene, polystyrene, chlorinated rubber, and like materials which are available commercially. Said cover is most conveniently applied to the receptacle by heat seal methods which are well known to those skilled in the art. A relatively low-strength bond between the cover element and the tear strip is desired and this can be accomplished by fabricating the tear strip and the cover from materials of different respective compositions which, when heat sealed together, adhere and cohere but do not unite in the sense of being fused or welded. Such tear strips can be peeled off the cover very easily. Another method for forming such low-strength bonds, which is particularly useful when the cover and the tear strip are fabricated from the same materials, is to coat the area of one of the surfaces which is to be heat sealed with a different plastic material. Such a coating can be applied from a solvent solution and dried before making the joint. The low-strength joint between the two materials may then be made by regular heat sealing.

Presently preferred plastic materials suitable for use in the practice of the invention are the normally solid polymers of 1-olefins having a density within the range of 0.940 to 0.980, preferably 0.950 to 0.963, gram per cubic centimeter, and a molecular weight within the range of about 35,000 to 250,000. As used herein, unless otherwise specified, the term "polymer" includes homopolymers of said 1-olefins as well as copolymers of one of said 1-olefins with another of said 1-olefins as a comonomer and blends of homopolymers. The 1-olefins having from 2 to 4 carbon atoms per molecule are usually preferred for preparing the polymer plastic materials used in the practice of the invention. However, any normally solid polymer of a 1-olefin having the properties set forth herein can be used in the practice of the invention. Methods for preparing and fabricating such normally solid polymers of said 1-olefins are well known to those skilled in the art. A preferred method for preparing said normally solid polymers of 1-olefins is that described and claimed in U.S. Patent 2,825,721 issued March, 4, 1958, to J. P. Hogan et al. Polymers prepared in accordance with the method of said patent are available commercially under the trademark Marlex.

A presently preferred plastic material for use in the practice of the invention is a polyethylene prepared in accordance with the method of said patent and having a density of at least 0.940 gram per cc. at 73–78° F., and a molecular weight of at least 35,000. This classification includes, in addition to homopolymers of ethylene, copolymers of ethylene with higher monoolefins and diolefins, e.g., propylene and 1-butene the higher comonomer generally being incorporated into the copolymer molecule in small proportions as compared with the ethylene monomer. Any desired amount of said comonomer can be utilized to form the copolymers so long as the density of the resulting copolymers is at least 0.940 gram per cc. Preferably, the polyethylene utilized has a density in the range of about 0.950 to 0.963 gram per cc. and a molecular weight in the range of about 35,000 to about 250,000.

Polyethylenes having the characteristics disclosed hereinbefore generally have a flexural modulus (determined at 73° F. in accordance with ASTM Method D 790–49T) of at least 100,000, and usually within the range of 160,000 to 240,000 p.s.i. These polyethylenes also have a brittleness temperature (determined according to ASTM Method D 746–55T) not greater than −20° F. and generally from −100 to below −180° F. These properties appear to explain, at least in part, the great suitability of the polyethylenes disclosed above for use in fabricating the containers of the invention.

Another property of this type polyethylene which appears to explain partially the suitability for the purposes of this invention is the fact that the impact strength of the polyethylene remains at a desirably high value even at very low temperatures, varying relatively slightly over a broad temperature range. Izod impact strength is measured in accordance with the ASTM Method D 256–54T, utilizing a ¼-inch bar of the tested plastic. One polyethylene which is illustrative of polyethylenes suitable for the purposes of the present invention has a density of approximately 0.960, a molecular weight of about 40,000, a melt index (ASTM Method D 1238–52T) of 0.7 and an Izod impact strength at 70° F. of approximately 3.0 foot-pounds per inch notch. The impact strength at 0° F. of this polyethylene is 2.0, and the impact strength at −100° F. is 1.0 foot-pound per inch notch.

Another property of such polyethylenes is that they have softening points above the boiling point of water, e.g., above about 260° F. The copolymers of the 1-olefins also have boiling points above the boiling point of water, e.g., above about 225° F. Thus foods can be cooked in the container.

Another property of the polyethylenes specified herein is that they have exceedingly low coefficients of friction as compared with other plastics. The numerical magnitude of the coefficient of friction of a particular material will depend upon the particular method of measurement used, as well as the material against which the tested material is contacted in measuring the coefficient of friction. Thus, in one method of measuring the coefficient of friction, involving rubbing a ½-inch diameter moving ball of the tested material against three stationary balls or disks of the plastics to be tested, in the absence of added lubricant, nylon (a polyamide resin) had a coefficient of friction of 0.550 at a 10-kilogram load and 0.218 at a 40-kilogram load, Teflon (a solid polymer of tetrafluoroethylene) had a coefficient of friction of 0.245 at a 10-kilogram load and a coefficient of friction of 0.046 at a 40-kilogram load, and a 0.960-density polyethylene having a molecular weight of 40,000 had a coefficient of friction of 0.100 at a 10-kilogram load and a coefficient of friction of 0.016 at a 40-kilogram load. This test procedure ("Friction and Wear") is more fully disclosed in a pamphlet entitled "Lubricants Test Illustrations," May 1, 1953, United States Steel Lubricants Testing Laboratory, National Tube Division, 327 Craft Avenue, Pittsburgh 13, Pennsylvania.

Paper board or other material which is capable of forming a heat seal with a thermoplastic material, such as polyethylene, can be used to form the cover or the container of the invention. Thus the cover can be paper board and the container can be thermoplastic or the cover can be thermoplastic and the container can be paper board. Both cover and container can be thermoplastic or both cover and container can be paper board provided there is a layer of thermoplastic between the paper board container and paper board cover where the two are heat sealed together or provided at least one of the paper board members has incorporated therein a sufficient quantity of thermoplastic material to effect a heat seal between the two members.

A container or carton for packaging liquids can be sealed by a closure member or cover which is cut through or slit along a line and sealed by a tear strip without the scored lines for removing a portion of the cover so that by removing the tear strip the contents can be poured from the carton by squeezing the sides of the carton.

The tear strip can be fabricated from any material which can be heat sealed to the cover and which has sufficient tensile strength in film form to withstand the force required to break the heat seal between the tear strip and the cover. A particularly suitable material is polyethylene terephthalate, which is available as "Mylar." This material is then preferably coated with a relatively low softening point thermoplastic such as polyethylene so that a heat seal can be easily and quickly obtained. One end of the tear strip is left unsealed to provide a tab to facilitate removal of the tear strip. In some cases it may be desirable to leave both ends of the strip unsealed so that the tear strip can be removed from either end. Instructions for opening the package are often printed on the tear strip.

While the containers of the invention have been illustrated as having a generally circular or a generally rectangular configuration, and as being provided with tapering side walls, the invention is not so limited. Said containers can be of any suitable shape or size. For example, the receptacle portion can be cylindrical with straight side walls. The receptacle can also be oval in shape.

While certain embodiments of the invention have been described for illustrative purposes the invention obviously is not limited thereto. Various other modifications can be apparent to those skilled in the art in view of this disclosure. Such modifications are within the spirit and scope of the invention.

That which is claimed is:

1. An article of manufacture comprising in combination:
    (1) a package comprising a rigid thermoplastic container having an open top;
    (2) a cover fused to said container, said cover having a lid section defined by an area smaller than said open top and bounded over a major portion of its periphery by a scored line on its upper face and a scored line on its lower face and bounded over a minor portion of its periphery by a line cut through said cover; and
    (3) a tear strip covering said line cut through said cover and heat sealed to said cover.

2. The article of claim 1 wherein the scored line on the lower face of the cover bounds a smaller area than the scored line on the upper face of said cover to form a ledge in the cover and a matching ledge on the lid.

3. The article of claim 1 wherein the area bounded by the scored lines defines three sides of a rectangle and the line cut through the cover defines the fourth side of the rectangle.

4. The article of claim 1 wherein the area bounded by the scored lines and the lines cut through the cover define substantially a circle.

5. The method of fabricating a hermetically sealed rigid thermoplastic container comprising a formed container having an open top and a cover adapted for fusing thereto onto said open top which comprises the steps of:
    (1) scoring a line in the top surface of the cover to define a portion of a lid section of said cover;
    (2) scoring the bottom surface of the cover to define a line parallel to said first scored line;
    (3) cutting through said cover on a line defining the remaining portion of said lid section;
    (4) covering the line cut through said cover with a strip of thermoplastic material; and
    (5) heat sealing said cover to said container and said strip to said cover.

6. The method of fabricating a hermetically sealed rigid container having a closure heat sealed thereto which comprises the steps of:
    (1) forming a crease in said closure to serve as a hinge for a lid section;
    (2) cutting a line through said closure substantially parallel to said crease;
    (3) scoring the upper surface of said closure to form a line joining each of the adjacent ends of said crease and said line cut through said closure;
    (4) scoring the lower surface of said closure to form a line parallel to and within said scored lines in the upper surface of said closure;
    (5) heat sealing a tear strip to the upper surface of said closure so as to cover the line cut through said closure; and
    (6) heat sealing said closure onto said container.

7. A hermetically sealed package comprising:
    (1) a formed container having an open top and a cover member sealed thereto;
    (2) a slit forming a cut-through portion of said cover communicating with said open top; and
    (3) a tear strip covering said slit and heat sealed to said cover over a major portion of the length of the strip sufficient to seal said slit.

8. A cover member for a formed container having an open top comprising:
    (1) a sheet of material conforming to the open top of said container and adapted to be sealed to the open top of said container;
    (2) said cover having a lid section therein defined by an area smaller than said open top and bounded over a major portion of its periphery by a scored line and over a minor portion of its periphery by a slit cut through said cover; and
    (3) a tear strip covering said slit and heat sealed to said cover, over a major portion of the length of the strip sufficient to seal said slit.

9. The cover of claim 8 having a scored line on its upper face and a scored line on its lower face, said scored line on its lower face bounding an area smaller than that bounded by the scored line on the upper face.

10. The cover of claim 9 wherein the area bounded by the scored lines defines three sides of a rectangle and the slit defines the fourth side of the rectangle.

11. The cover of claim 8 wherein the area bounded by the scored lines and the slit define substantially a circle.

12. An article of manufacture comprising in combination:
    (1) a formed container having an open top;
    (2) a cover sealed to and closing the open top of said container, said cover having a lid section defined by an area smaller than said open top and bounded by a crease to serve as a hinge, a slit cut through said cover opposite said crease, and a scored line on the upper and lower face of the cover joining each end of the slit to each end of the crease; and
    (3) a tear strip covering said slit and heat sealed to said cover over a major portion of the length of the strip sufficient to seal said slit.

References Cited by the Examiner

UNITED STATES PATENTS

| | | | |
|---|---|---|---|
| 1,827,636 | 10/1931 | Ames. | |
| 2,341,397 | 2/1944 | Smith. | |
| 2,583,211 | 1/1952 | Fleming | 229—51 X |
| 2,626,096 | 1/1953 | Hickin | 229—51 |
| 2,649,392 | 8/1953 | Marshall. | |
| 2,719,663 | 10/1955 | Meyer-Jagenberg | 229—51 X |
| 2,880,859 | 4/1959 | Tupper | 150—5 X |
| 2,951,765 | 9/1960 | Robson | 206—56 |
| 2,953,293 | 9/1960 | Anderson | 229—51 |
| 3,019,944 | 2/1962 | Nelson et al. | |
| 3,069,273 | 12/1962 | Wayne | 229—51 X |
| 3,101,870 | 8/1963 | Betner | 150—5 X |

FOREIGN PATENTS

| | | |
|---|---|---|
| 521,898 | 8/1953 | Belgium. |
| 467,176 | 8/1950 | Canada. |
| 68,617 | 2/1949 | Denmark. |
| 1,152,024 | 2/1958 | France. |
| 799,792 | 8/1958 | Great Britain. |

FRANKLIN T. GARRETT, *Primary Examiner.*

EARLE J. DRUMMOND, GEORGE O. RALSTON,
*Examiners.*

J. J. HOEY, *Assistant Examiner.*